Jan. 9, 1945. R. C. ULM 2,367,158
LIQUID SEAL VENT
Filed Feb. 26, 1943 3 Sheets-Sheet 1

INVENTOR.
Reign C. Ulm,
BY

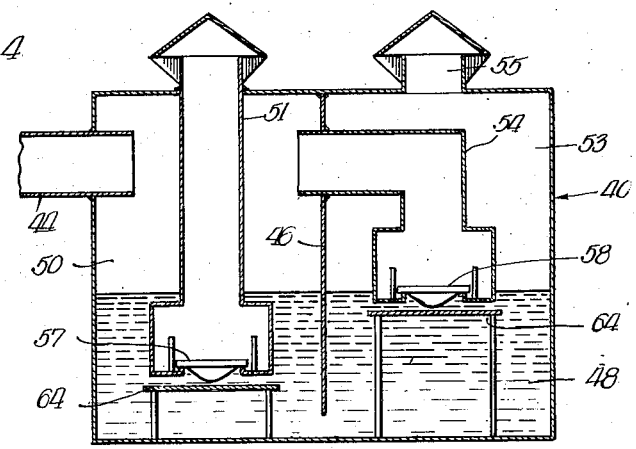
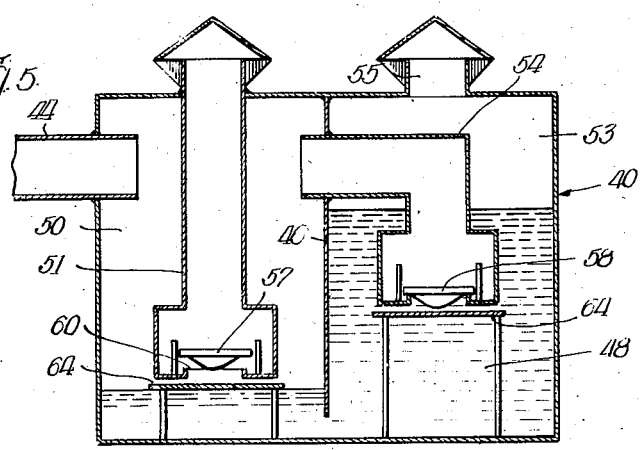
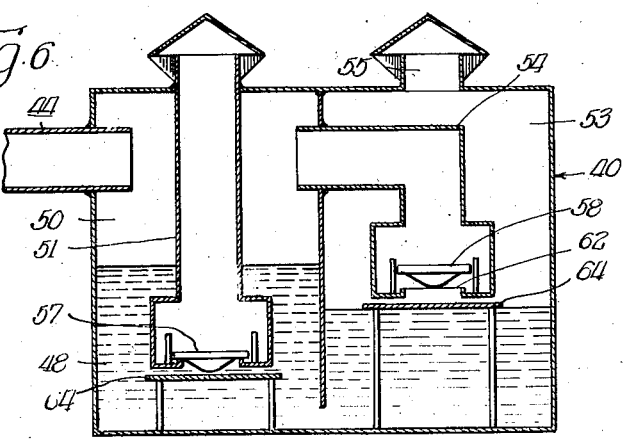

Jan. 9, 1945.   R. C. ULM   2,367,158
LIQUID SEAL VENT
Filed Feb. 26, 1943   3 Sheets-Sheet 3
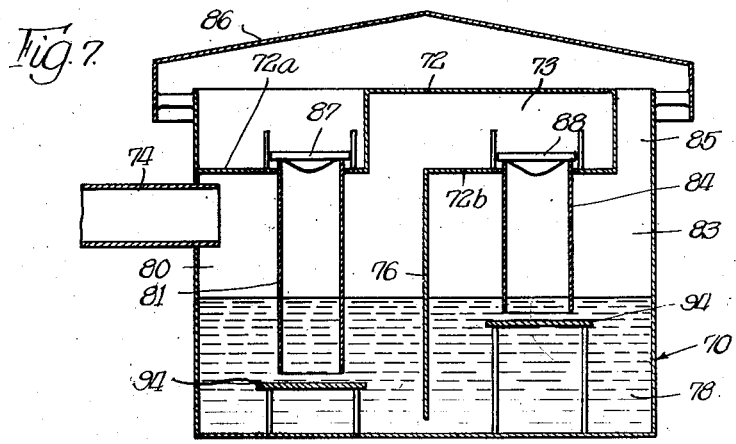
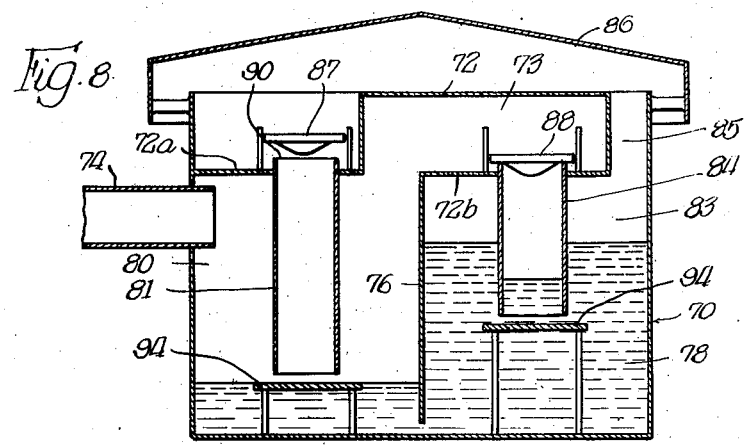
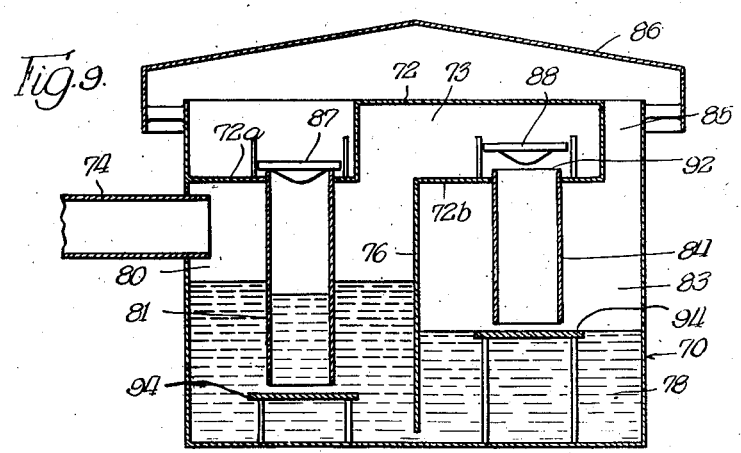
INVENTOR.
Reign C. Ulm,
BY Patented Jan. 9, 1945

2,367,158

UNITED STATES PATENT OFFICE 2,367,158

LIQUID SEAL VENT

Reign C. Ulm, East Chicago, Ind., assignor to Graver Tank & Mfg. Co., Inc., Catasauqua, Pa., a corporation of Delaware Application February 26, 1943, Serial No. 477,225

8 Claims. (Cl. 277—61)

The invention relates to valves of the liquid type and has reference more particularly to a liquid seal for controlling an atmospheric vent opening.

An object of the invention is to provide a liquid seal for an atmospheric vent whereby excessive vapor pressures within a storage tank, for example, or the creation of a vacuum within such tank can be effectively relieved before any damage is done to the tank or associated structure.

A further object is to provide a liquid controlled vent for relieving excessive pressures or for admitting air to relieve a vacuum such as may develop in a storage tank for storing volatile liquids, and wherein a float valve is provided for operation when an excessive pressure develops and a separate and independent float valve is provided for operation to relieve a vacuum.

Another object is to provide apparatus as described having a valve in association with an atmospheric vent for operation when a pressure develops and having a separate and independent valve also in communication with its atmospheric vent for operation when a vacuum develops.

Another object is to provide a liquid seal vent which will operate on either a pressure or a vacuum in a manner wherein no air or vapor will be drawn through or caused to bubble through the sealing liquid.

Another object is to provide a liquid seal of the character described which will seal the pressure and vacuum passages by respective valves having independent operation and wherein said passages are caused to provide a vent without passing air or vapor through the sealing liquid.

With these and various other objects in view, the invention may consist of certain novel features of construction and operation as will be more fully described and particularly pointed out in the specification, drawings and claims appended hereto.

In the drawings, which illustrate an embodiment of the invention, and wherein like reference characters are used to designate like parts—

Figure 4 is a vertical sectional view illustrating another modification of liquid seal vent coming within the invention;

Figure 5 is a view similar to Figure 4 but showing the pressure valve in operative position for releasing to the atmosphere;

Figure 6 is a view similar to Figure 4 but showing the vacuum valve in vacuum release position;

Figure 7 is a vertical sectional view illustrating another modification of liquid seal vent coming within the invention;

Figure 8 is a view similar to Figure 7 but showing the pressure valve in venting position; and Figure 9 is a view similar to Figure 7 but showing the vacuum valve in vacuum release position.

Figure 1:
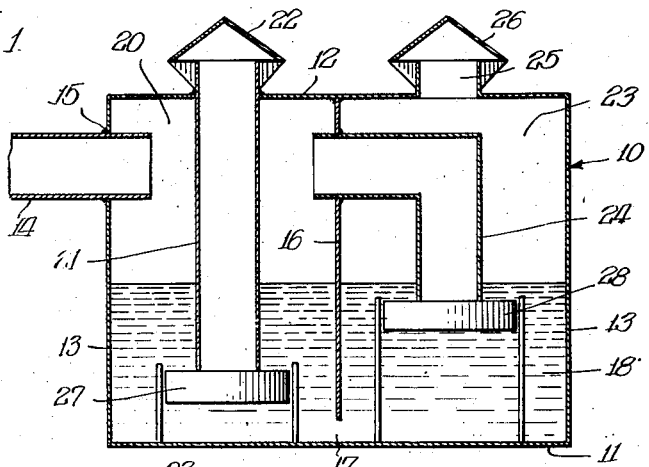
Figure 1 is a vertical sectional view illustrating one modification of liquid seal vent coming within the invention wherein the float valves are located in the sealing liquid in alignment with their respective vent passages.
Figure 2:
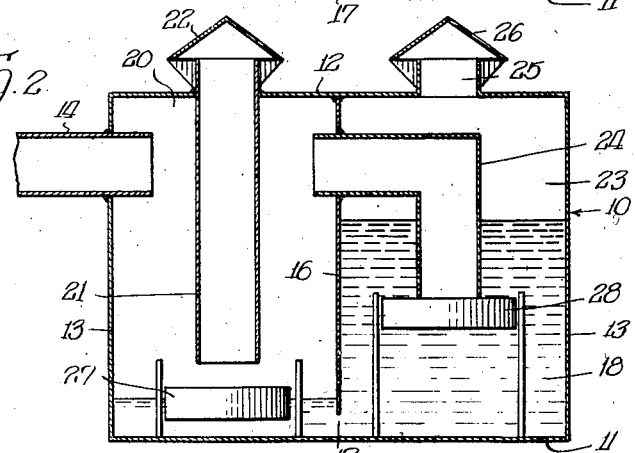
Figure 2 is a view similar to Figure 1 but showing the pressure valve in operative position for releasing to the atmosphere.
Figure 3:
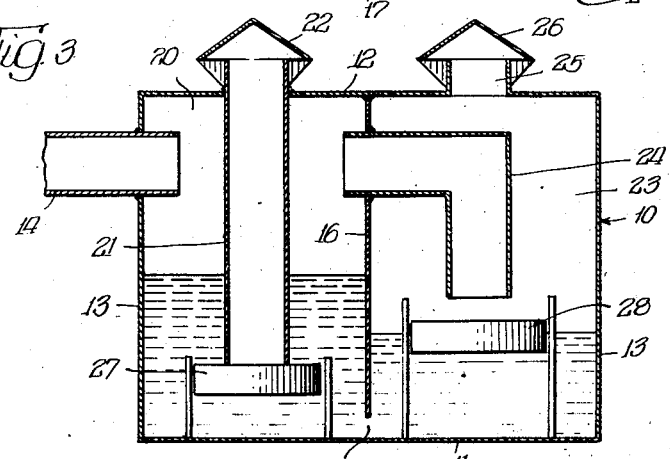
Figure 3 is a view similar to Figure 1 but showing the vacuum valve in vacuum release position.

In the modification shown in Figures 1, 2 and 3 the movable valve elements are located in the sealing liquid and the same are maintained in alignment by any suitable means with their particular venting passage. In the modification shown in Figures 4, 5 and 6 the movable valve elements are located within their particular venting passage and are adapted to have contact with a valve seat provided in the base of said passages. In the modification of Figures 7, 8 and 9 a similar type of movable valve element is used but the same is positioned in the upper portion of its particular venting passage whereby the valve element will not have contact with the sealing liquid at any time during operation of the apparatus.

Referring to Figures 1, 2 and 3, the housing or container for the present venting device is indicated by numeral 10. Said housing is substantially rectangular in vertical section, having a bottom wall 11, a top wall 12, and side walls 13 and 13. The side wall 12 is provided with a pipe or conduit 14 which extends through the wall, being suitably welded thereto at 15 so as to form an airtight connection. The conduit 14 is in communication with the interior of the housing 10 and it will be understood that for operation of the present apparatus said conduit 14 will have connection to a storage tank or similar device such as one containing a volatile liquid which requires an atmospheric vent. In other words, the tank or chamber to be vented communicates with the housing 10 of the venting device by means of the conduit 14. Said tank or chamber provides a source of pressure or vacuum. When the pressure exceeds a predetermined maximum it is the function of the present venting device to relieve the same by venting the high pressure gas or vapor to the atmosphere. Likewise when a vacuum exists within the tank or chamber the present apparatus will function to relieve said vacuum by providing an open passage for the same leading to the atmosphere, whereby air is drawn to relieve the vacuum and normal conditions are thus established within the tank or chamber.

The housing 10 is divided into two compartments by the partition or dividing wall 16 which extends vertically from the top wall 12 toward the bottom wall 11. Said partition is connected as by welding to the three walls of the housing, namely, the front and rear walls in addition to the top wall, but it will be understood that said partition terminates short of the bottom wall 11 whereby to provide a connecting channel 17 so that the sealing liquid may flow to and from the compartments. The conduit 14 enters the compartment 20 located on the left hand side of the partition wall 16. This compartment is provided with a vertically disposed venting tube 21 which extends through the top wall 12 of the housing, being suitably joined thereto as by welding to provide an effective seal. The end of the venting tube projecting above the top wall 12 is provided with a conically shaped cap 22. Said cap allows the gases or vapors to be expelled from the venting tube to the atmosphere and in addition the cap prevents rain and snow from entering the tube.

The compartment 23 is provided with a venting tube 24 having a vertical upright portion and a horizontally disposed portion since the venting tube has the shape of a right angle. The horizontal portion of said venting tube extends through the partition wall 16, being suitably sealed thereto, and projects into the compartment 20. The top wall 12 of the compartment 23 is provided with an atmospheric opening 25, which is capped by means of a conical member 26 similar in size to cap 22 and which functions to admit air to the compartment 23 while preventing rain or snow from entering said compartment.

It will be observed by reference to Figures 1, 2 and 3 that the venting tube 21 extends well toward the bottom of its compartment 20, whereas, venting tube 24 is considerably shorter and terminates approximately mid-way or a short distance below mid-way of the height of the housing. Float valves 27 and 28 are associated with the venting tubes 21 and 24, respectively. Each movable valve element is adapted to have contact with the open bottom end of its respective venting tube to seal said end of the tube, preventing gases or vapors from escaping from the compartment 20 and also for preventing air from entering the tube 24 in the case of the compartment 23.

Housing 10 contains a quantity of sealing liquid 18 in an amount sufficient to cover both of the float valves 27 and 28 when normal conditions exist in both compartments 20 and 23. In other words, when the pressure in compartment 20 substantially equals that existing in the atmospheric compartment 23, the liquid in both compartments will seek the same level and when these conditions exist the float valves are completely immersed and are buoyed by the liquid into contact with the open bottom end of their respective venting tube. As shown in Figure 1, the level of the sealing liquid in compartment 23, when normal conditions exist, is just slightly above the depending end of the venting tube 24. Any suitable means may be provided for maintaining the float valves in alignment with their respective venting tube. Such means will properly position the float elements and also permit vertical movement toward and from their venting tube. When in contact with their particular venting tube the valve elements can be considered as in sealing position and when out of contact with their tubes the said elements can be considered as in venting position.

Figure 2 shows the position of the valve elements and the level of the sealing liquid in the several compartments for pressure release. It may be assumed that the tank or chamber connected to the venting apparatus by conduit 14 is under abnormal pressures. As the pressure reaches a predetermined maximum the sealing liquid in compartment 20 will be caused to descend to a level below the open bottom end of venting tube 21. The liquid from compartment 20 is caused by the pressure in said compartment to flow through channel 17 into the compartment 23 and the liquid level in the same rises accordingly. Since the valve element 27 is maintained in sealing contact with its venting tube 21 only by the buoyancy of the sealing liquid it will be understood that the float element naturally assumes a venting position when the liquid level falls below the open bottom end of said venting tube. When this takes place the excessive pressures are discharged to the atmosphere and the venting operation continues until approximately normal conditions are restored. Normal conditions are substantially atmospheric conditions such as prevail within compartment 23, which is open at all times to the atmosphere. Only when normal conditions prevail will the liquid in said compartment fall to a lower level to cause a corresponding rise in the liquid level within compartment 20. A rise in the liquid level within this compartment will cause the valve element 27 to again contact tube 21, sealing the end of the tube and preventing further escape of the gas or vapors from the tank.

Figure 3 illustrates the position of the valve elements and the liquid level in the various compartments for vacuum release. In the event a vacuum condition exists in the tank or chamber connecting with conduit 14, it will be understood that a similar vacuum condition will exist in compartment 20. Said compartment can be placed in communication with compartment 23 only through the venting tube 24. The reduction in pressure within compartment 20 will effect a rise in the liquid within the compartment and cause a corresponding lowering of the liquid level within compartment 23. As the level of the liquid within said compartment drops it will eventually release the valve element 28, causing said element to assume a venting position. Air from the outside will therefore flow through tube 24 into compartment 20 and into the conduit 14 to relieve the vacuum existing in the tank or chamber connecting therewith. The normal liquid level in the compartments will be established only when the vacuum conditions have been completely relieved, in which event valve element 28 will be again caused to contact and seal its venting tube 24.

In operation of the present venting apparatus both for pressure release and for vacuum release it will be appreciated that neither air nor vapor is caused to pass through or bubble through the sealing liquid. Loss of the sealing liquid by being carried along with the vapor or air is thereby effectively prevented since the valve elements are forced into a sealing position and are caused to move into a venting position without passing the air or vapor through any part of the sealing liquid.

In the modification of Figures 4, 5 and 6 the housing or container 40 is suitably connected by a pipe or conduit 44 with a tank or chamber to be vented. The interior of the housing is likewise provided with a dividing partition wall 46 which forms the housing into two compartments 50 and 53. In compartment 50 the venting tube 51 extends vertically and has a portion projecting beyond the top wall of the housing by means of which the venting tube is in communication with the atmosphere. The venting tube 54 in chamber 53 is provided with a right angled bend so that the same has a vertically depending portion and a horizontally disposed portion, which latter portion extends through the partition wall 46. The compartment 53 containing said venting tube is open to the atmosphere at all times by means of the passage 55 in the top wall of the housing.

In this modification the lower end of each venting tube is enlarged to conveniently accommodate the valves 57 and 58. Each movable valve element is adapted to rest on its valve seat, in which position the valve will seal the open bottom end of its respective venting tube. In Figure 5 the valve seat for venting tube 51 is indicated by numeral 60 and in Figure 6 numeral 62 indicates the valve seat provided by the venting tube 54. Also in this modification an entrainment eliminator 64 is provided for each venting tube, the same having location directly below the valve opening in its respective tube. Each entrainment eliminator is in the form of a flat plate or disc and it will be observed that the same has location directly below a movable valve element. The function of these plates is to eliminate contact between the air or vapors and the sealing liquid and particularly such contact as will result in entrainment of the sealing liquid by the air or vapors during their travel into or from the venting tube. This carrying away of the sealing liquid is minimized to a considerable degree by the improved apparatus of this invention, since on pressure release and also on vacuum release neither the air nor vapor is caused to pass through or bubble through the sealing liquid. The use of the entrainment eliminator is an additional safety measure since when the respective valve elements are in a venting position the level of the sealing liquid in the particular compartment will be approximately on a line with the eliminator or somewhat below the same.

In Figure 5 the pressure of the gas or vapor within compartment 50 has effected a lowering of the level of the sealing liquid 48 in that compartment to an extent where the valve 57 is in a venting position. As a result the high pressure gases or vapors are vented to the atmosphere, which operation continues until normal conditions are again established. During the venting operation it will be clearly understood that valve 58 is maintained on its seat as a result of the high pressure existing within venting tube 54. This pressure is more than sufficient to over-balance the tendency of the sealing liquid to lift valve 58 off its seat 62. Valve 57 has a similar action when normal or vacuum conditions exist. This can best be understood by reference to Figure 4 wherein it will be observed that valve 57 is subjected to some pressure on its underside by the sealing liquid. This tends to lift the valve 57 off its seat 60. However, the top side of the valve is subjected to air at atmospheric pressure, which in addition to the weight of the valve is sufficient to over-balance the liquid pressure tending to move the valve into an upward position.

In Figure 6 the creation of a vacuum within chamber 50 has resulted in a reverse movement of the liquid since the same has been caused to flow into compartment 50 and to thus lower the liquid level in compartment 53. Eventually the liquid will reach a level where the valve 58 is lifted from its seat 62 by the pressure of the air in chamber 53. The action of the valve in moving to a venting position will admit air to chamber 50 to relieve the vacuum.

The modification of Figure 7 differs from that shown in Figure 4 in that the movable valve elements are positioned at the top of their venting passage whereby the valve elements do not have contact with the sealing liquid at any time during operation of the apparatus. The housing or container 70 is provided with a pipe or conduit 74 by means of which the apparatus is connected to the tank or chamber to be vented. The interior of the housing 70 is characterized by a top wall 72, provided with a sunken portion 72a and a part 72b which forms with the top wall an auxiliary chamber 73. A conical roof 86 extends over the top of the housing, the same having depending skirt portions to effectively prevent the entrance of rain or snow into the housing. The wall or dividing partition 76 divides the housing into a compartment 80 which communicates with the auxiliary chamber 73 and into a compartment 83, the latter having access to the air by means of the passage 85. The venting tube 81 is located in compartment 80, the same extending through and beyond the top wall 72a of this compartment. A venting tube of similar shape, identified by numeral 84, is located in compartment 83, and in accordance with the invention this venting tube extends through the wall 72b to project into the auxiliary chamber 73.

The upper end of each venting tube is normally closed by means of a movable valve element indicated by numerals 87 and 88, respectively. Whereas, valve 87 is located above the wall 72a and is thus subjected to atmospheric pressure at all times, the movable valve element 88 is located within the auxiliary chamber 73 and is therefore subjected to whatever pressure exists within chamber 80. The upper end of the venting tube 81 provides a valve seat 90 for valve 87 as shown in Figure 8, and Figure 9 in a similar manner shows valve seat 92 provided by the upper end of the venting tube 84 for the valve 88. Each venting tube depends vertically within its chamber and it will be observed that venting tube 81 is considerably longer than tube 84, the latter tube terminating approximately mid-way of the housing or a slight distance below mid-way of the height of the housing.

In the devices of Figures 4 and 7 the vacuum valves 58 and 88 are each made lighter in weight than their corresponding pressure valves.

In the modification of Figure 7 an entrainment eliminator 94 is provided for each venting tube, the same having location directly below and in alignment with the open bottom end of said tube. Each entrainment eliminator is in the form of a flat plate or disc and the same functions to eliminate contact between the air or vapors and the sealing liquid during operation of the apparatus. For example, as pressure builds up in chamber 80 the liquid level is lowered although the pressure forces the liquid to rise higher in tube 81. However, valve 87 does not open immediately as the liquid reaches the lower end of tube 81 but stays closed until the level reaches approximately the top of plate 94. This allows the liquid forced into said tube to drain before valve 87 opens. Consequently the air or vapor is allowed to escape through the tube past valve 87 without passing through the liquid.

Figure 8 illustrates the operation of this particular modification for pressure release. The level of the sealing liquid 78 in compartment 80 has been lowered sufficiently to uncover the open bottom end of the venting tube 81. The high pressure air or vapor within this compartment 80 is therefore permitted to escape to the atmosphere, the valve 87 assuming a venting position during this operation.

Figure 9 illustrates the operation of the apparatus for vacuum release. The reduced pressure in compartment 80 causes the liquid to rise within said chamber with a corresponding lowering of the liquid in compartment 83. Eventually the open bottom end of vent tube 84 is uncovered and atmospheric air will therefore flow in past valve 88 through the auxiliary chamber 73 and into compartment 80 to relieve the vacuum.

The movable valve elements in this modification are out of contact with the sealing liquid and also said valve elements are shielded from the weather by the roof 86. This improvement eliminates any chance of liquid leaking into the pressure outlet above the valve because of a leaky valve thereby causing entrainment.

What is claimed is:

1. In a vent of the character described, a housing adapted to contain a sealing liquid, a substantially vertical partition dividing the interior into two compartments, said partition terminating a distance above the bottom of the housing whereby the compartments communicate with each other so that the sealing liquid may flow from one compartment to the other, one of said compartments adapted to receive a fluid medium of variable pressure whereby different pressure conditions prevail within said compartment, the other compartment having an open passage leading to the atmosphere whereby atmospheric pressure prevails within, a venting tube in the variable pressure compartment having a depending lower end adapted to extend into the sealing liquid under certain operating conditions and having its upper end extending through the top wall exteriorly of the housing, another venting tube located in the atmospheric compartment and also having a depending lower end extending into the sealing liquid under certain operating conditions, said last mentioned venting tube having its opposite end extending into the variable pressure compartment, and a valve in associated relation with each venting tube for closing its particular tube.

2. In a vent of the character described, a housing adapted to contain a sealing liquid, a substantially vertical partition dividing the interior into two compartments, said partition terminating a distance above the bottom of the housing whereby the compartments communicate with each other so that the sealing liquid may flow from one compartment to the other, one of said compartments adapted to receive a fluid medium of variable pressure whereby different pressure conditions prevail within said compartment, the other compartment having an open passage leading to the atmosphere whereby atmospheric pressure prevails within, a venting tube in the variable pressure compartment having a depending lower end adapted to extend into the sealing liquid under certain operating conditions and having its upper end extending through the top wall exteriorly of the housing, another venting tube located in the atmospheric compartment and also having a depending lower end extending into the sealing liquid under certain operating conditions, said last mentioned venting tube having its opposite end extending into the compartment subjected to different pressure conditions, and a valve in associated relation with each venting tube for closing the venting tube, each valve being constructed and arranged to open when the sealing liquid in its particular compartment drops to a level below the lower depending end of its venting tube, whereby said particular compartment and its venting tube are placed in communication with each other.

3. In a vent of the character described, a housing adapted to contain a sealing liquid, a substantially vertical partition dividing the interior into two compartments, said partition terminating a distance above the bottom of the housing whereby the compartments communicate with each other so that the sealing liquid may flow from one compartment to the other, one of said compartments adapted to receive a fluid medium of variable pressure whereby different pressure conditions prevail within the compartment, the other compartment having an open passage leading to the atmosphere whereby atmospheric pressure prevails within, a venting tube in each compartment, each tube having a lower depending end adapted to extend into the sealing liquid in its particular compartment under certain operating conditions, each said tube providing an atmospheric vent for the compartment subjected to different pressure conditions, and a valve in associated relation with each said venting tube.

4. In venting apparatus of the liquid sealing type, a housing, a depending partition within the housing terminating short of the bottom for dividing the interior into two compartments having a connecting channel below the partition, a sealing liquid in the housing adapted to have a normal liquid level which is substantially the same for both compartments under normal operating conditions, a venting tube in each compartment having a depending end extending below the normal liquid level, the opposite end of one of said tubes projecting through a wall of its compartment to provide an atmospheric vent for said compartment, the opposite end of the other venting tube projecting through the partition and communicating with the compartment having said atmospheric vent, the compartment containing said other venting tube having an opening leading to the atmosphere, and a valve for each venting tube.

5. In venting apparatus of the liquid sealing type, a housing, a depending partition within the housing terminating short of the bottom for dividing the interior into two compartments having a connecting channel below the partition, one of said compartments being subjected to variable pressures from above atmospheric to below atmospheric, the other compartment having an opening leading to the atmosphere whereby only atmospheric pressure prevails within, a sealing liquid in the housing adapted to have a normal liquid level which is substantially the same for both compartments under normal operating conditions, a venting tube in the variable pressure compartment extending through a wall to communicate with the atmosphere and depending below the normal level of the sealing liquid in said compartment, another venting tube in the atmospheric compartment extending through a wall thereof to communicate with the variable pressure compartment and said tube also having a depending end extending below the normal liquid level in said atmospheric compartment but to a less extent than the first mentioned tube, and a valve for each venting tube for normally closing the tube.

6. In venting apparatus of the liquid sealing type, a housing, a depending partition within the housing terminating short of the bottom for dividing the interior into two compartments having a connecting channel below the partition, one of said compartments being subjected to variable pressures from above atmospheric to below atmospheric, the other compartment having an opening leading to the atmosphere whereby only atmospheric pressure prevails within, a sealing liquid in the housing adapted to have a normal liquid level which is substantially the same for both compartments under normal operating conditions, a venting tube in the variable pressure compartment extending through a wall to communicate with the atmosphere and depending below the normal level of the sealing liquid in said compartment, another venting tube in the atmospheric compartment extending through a wall thereof to communicate with the variable pressure compartment and said tube also having a depending end extending below the normal liquid level in said atmospheric compartment but to a less extent than the first mentioned tube, and a float valve located in each compartment below its particular venting tube and adapted to co-act with the depending end of said tube for normally closing the tube.

7. In venting apparatus of the liquid sealing type, a housing, a depending partition within the housing terminating short of the bottom for dividing the interior into two compartments having a connecting channel below the partition, one of said compartments being subjected to variable pressures from above atmospheric to below atmospheric, the other compartment having an opening leading to the atmosphere whereby only atmospheric pressure prevails within, a sealing liquid in the housing adapted to have a normal liquid level which is substantially the same for both compartments under normal operating conditions, a venting tube in the variable pressure compartment extending through a wall to communicate with the atmosphere and depending below the normal level of the sealing liquid in said compartment, another venting tube in the atmospheric compartment extending through a wall thereof to communicate with the variable pressure compartment and said tube also having a depending end extending below the normal liquid level in said atmospheric compartment but to a less extent than the first mentioned tube, a valve for each venting tube adapted to coact with the lower depending end of the tube to thereby normally close said tube, and a substantially flat disc located directly below the valve of each venting tube, said discs functioning to substantially prevent entrainment of the sealing liquid by the pressure medium during flow of the same past the valve.

8. In venting apparatus of the liquid sealing type, a housing, a depending partition within the housing terminating short of the bottom for dividing the interior into two compartments having a connecting channel below the partition, one of said compartments being subjected to variable pressures from above atmospheric to below atmospheric, the other compartment having an opening leading to the atmosphere whereby only atmospheric pressure prevails within, a sealing liquid in the housing adapted to have a normal liquid level which is substantially the same for both compartments under normal operating conditions, a venting tube in the variable pressure compartment extending through a wall to communicate with the atmosphere and depending below the normal level of the sealing liquid in said compartment, another venting tube in the atmospheric compartment extending through a wall thereof to communicate with the variable pressure compartment and said tube also having a depending end extending below the normal liquid level in said atmospheric compartment but to a less extent than the first mentioned tube, and a valve for each venting tube having coacting relation with the upper end of the tube for normally closing the same, whereby said valves are out of contact with the sealing liquid at all times.

REIGN C. ULM.